United States Patent
Hart

(10) Patent No.: US 8,905,423 B2
(45) Date of Patent: Dec. 9, 2014

(54) CONVERTIBLE TRAILER AND STORAGE BASKET

(71) Applicant: Brian Hart, Allenton, WI (US)

(72) Inventor: Brian Hart, Allenton, WI (US)

(*) Notice: Subject to any disclaimer, the term of this patent is extended or adjusted under 35 U.S.C. 154(b) by 0 days.

(21) Appl. No.: 13/776,849

(22) Filed: Feb. 26, 2013

(65) Prior Publication Data

US 2013/0221629 A1 Aug. 29, 2013

Related U.S. Application Data

(60) Provisional application No. 61/604,378, filed on Feb. 28, 2012.

(51) Int. Cl.
| | |
|---|---|
| *B60D 1/52* | (2006.01) |
| *B62J 9/00* | (2006.01) |
| *B62D 63/06* | (2006.01) |
| *B62K 27/00* | (2006.01) |

(52) U.S. Cl.
CPC ............... *B62D 63/061* (2013.01); *B62J 9/00* (2013.01); *B62K 27/003* (2013.01)
USPC ..................... 280/415.1; 280/656; 280/79.11; 280/79.4

(58) Field of Classification Search
USPC ............... 280/638, 415.1, 43, 656, 46, 79.11, 280/79.4
See application file for complete search history.

(56) References Cited

U.S. PATENT DOCUMENTS

| | | | |
|---|---|---|---|
| 7,055,848 B1 | 6/2006 | James | |
| 7,438,309 B2 * | 10/2008 | Tai | ................. 280/656 |
| 7,540,528 B2 | 6/2009 | Spainhower | |
| 7,891,697 B1 | 2/2011 | Fahrbach | |
| 7,997,605 B2 | 8/2011 | Kittrell | |
| 2009/0001756 A1* | 1/2009 | Dempsey et al. | ............. 296/173 |
| 2009/0232633 A1 | 9/2009 | Stamps | |

* cited by examiner

*Primary Examiner* — Jeffrey J Restifo
*Assistant Examiner* — Erez Gurari
(74) *Attorney, Agent, or Firm* — Daniel Boudwin; Global Intellectual Property Agency LLC

(57) ABSTRACT

Provided is an all-terrain trailer for hauling large objects over uneven landscapes. The trailer is capable of carrying items within its volume in both its deployed and stowed state. Deployed, the trailer is a basket shaped body with a pair of wheels removably secured via a removable axle. The trailer is attached to the lead vehicle using a removable trailer hitch linkage that is secured to the basket body via fasteners. In a stowed state, the tires and axle are stored within a storage area in a lower portion of the basket body. In one embodiment, a false bottom is placed over the storage area, creating a flat trailer bed that objects can be laid upon. The basket body is removably secured to the hood of a lead vehicle, thereby providing a carrying basket while the vehicle is in transit.

14 Claims, 8 Drawing Sheets

CONVERTIBLE TRAILER AND STORAGE BASKET

CROSS REFERENCE TO RELATED APPLICATION

This application claims the benefit of U.S. Provisional Application No. 61/604,378 filed on Feb. 28, 2012, entitled "Basket Hauler." The patent application identified above is incorporated here by reference in its entirety to provide continuity of disclosure.

BACKGROUND OF THE INVENTION

1. Field of the Invention

The present invention relates to an all-terrain vehicle (ATV) trailer. More specifically, it relates to a convertible trailer and storage basket. The basket can be removably secured to a rack on the front of an ATV, where it holds loose items, spare parts, medicine kits, and the like. An axle and pair of wheels are included and may be added to the basket to form a trailer that is towed behind the ATV. The device will be appreciated by sportsmen, emergency medical staff. Farmers and any others who need to haul equipment across uneven or unpaved terrain.

Trailers are mobile storage containers that are towed by a lead vehicle to which the trailer attaches. They are used to carry items that don't fit within or may damage the lead vehicle. Size and construction of trailers varies according to their intended use and style of towing vehicle. Some trailers are towed by automobiles on paved roads and have large storage capacities due to the relative ease of towage. Other trailers are pulled by all-terrain vehicles, tractors, snowmobiles, and the like. These trailers must be low to the ground and have reduced carrying capacity because they must travel over uneven ground.

Traversing unpaved terrain can be difficult and often requires specialized equipment. All-terrain vehicles (ATVs) are similar to motorcycles but have three to four large wheels. The size and flexibility of the wheels enables them to overcome obstacles that would stymie most automobiles. Snowmobiles are similar to ATVs but have large ski-like feet rather than flexible tires. Both of these vehicles are ideal for transportation and hauling in unpaved or uneven areas.

As mentioned above, trailers intended for all terrain use will have a different structure than those intended for highway use. The trailer must be lightweight to reduce strain on the lead vehicle, which must pull the trailer over obstacles. It must have a strong durable construction capable of holding tool chests, game animals, sports equipment, and the like. The trailer should preferably have a stowed configuration that can be secured to the ATV body, when hauling is not needed. A single user should be able to manipulate the configuration of the trailer without the need for extraneous tools. A lightweight, collapsible trailer that can be attached to an ATV as a storage basket when not used for hauling is needed.

2. Description of the Prior Art

The present invention provides a storage basket that converts to a lightweight trailer for all terrain use. It is a rectangular basket with a storage compartment in the bottom that contains two wheels and an axle. The axle may also be stored within an axle bracket disposed on the underside of the basket. A false bottom may be included to cover the tire storage compartment and facilitate hauling of items that need to lay flat. Fasteners are included for securing the basket to the hood or storage rack of an ATV, trailer or snowmobile, so that the basket can be used as a container when hauling is not needed. The prior art devices do not teach these structural elements.

Collapsible trailers are often used for infrequent hauling or hauling over uneven terrain, because the trailer can easily be stowed between uses. Trailers that fold in half are beneficial to users who need as much space as possible, because these trailers generally fold into a generally planar shape. Spainhower, U.S. Pat. No. 7,540,528 discloses a trailer having a front and back deck portion. A hinge joint separates the two decks, permitting the trailer to fold in half for easy storage. One portion has an axle and two wheels. While the other portion has a linkage structure that removably connects to the trailer to a lead vehicle. A similar device is disclosed by Fahrbach, U.S. Pat. No. 7,891,697. The Fahrbach trailer has a tri-portion trailer be, in which the portions fold together, relative to the central portion. Wheels are secured to the central portion, thus the front and back portions collapse on the wheel bearing portion. Neither Spainhower nor the Fahrbach device teach a basket body with upstanding walls, removable wheels, and a storage cavity for storing the wheels, They are not useful for storing or carrying items when the trailer is in a stowed state. Conversely, the present invention is a storage container with removable wheels that are stowed within the container when it is not in use as a trailer.

Another type of collapsible trailer utilizes removable or foldable sidewalls to re create a stowed state of reduced size for the deployed state. James, U.S. Pat. No. 7,055,848 teaches an ATV trailer that has a collapsible front wall and a small rear wall. Like the Fahrbach device, the James trailer has a tri-portion bed. The front portion hingeably connects to the center portion and folds over top of same, while the back portion is hingeably connected to the center portion and folds underneath the center portion. The front wall collapses for easy storage. The front portion forms an upstanding forward wall when deployed. A shorter, read wall is secured to the back of the pack portion. In its stowed state, the trailer is compacted and affixed to the rear of an ATV with the trailer wheels in a generally vertical alignment. This state is helpful for transporting the trailer but does not permit carrying of other items in the trailer while in transport. The present invention has a basket body that is affixable to the front of a lead vehicle, so that loose items may be carried therein, while the trailer is stowed.

Carts and trailers that do not offer any collapsible properties are also known in the art of off-road hauling devices. Some carts provide small sidewalls surrounding the trailer bed perimeter, for preventing objects from falling off the bed. Others have load bearing sidewalls that permit larger objects to be held within or on the trailer. Examples of non-collapsible trailers are taught by Stamps, U.S. Patent Application Publication No. 20090232633 and Kitrell, U.S. Pat. No. 7,997,605. Both of these devices disclose a basket style trailer body with one or more sets of wheels and a hitch linkage assembly extending from one side of the trailer. Like other trailers, these devices do not offer removable wheels that can be securely stowed within a predetermined space in the trailer. The present invention provides the features to permit use of the trailer as a storage container when the wheels are detached.

These prior art devices have several known drawbacks. It does not disclose a basket style trailer that has removable wheels and axle. Further, it does not disclose a storage cavity or set of securing brackets for securely stowing trailer tires. The present invention has removable tires that may be stored within the basket. It is affixable to the hood of a lead vehicle, facilitating use as a storage basket, when stowed. It substantially diverges in design elements from the prior art and consequently it is clear that there is a need in the art for an improvement to existing all-terrain trailer devices. In this regard the instant invention substantially fulfills these needs.

SUMMARY OF THE INVENTION

In view of the foregoing disadvantages inherent in the known types of all-terrain trailers now present in the prior art, the present invention provides a new removable wheel system and self-contained stowed state wherein the same can be utilized for providing convenience for the user when transporting the trailer between hauling sites.

The present invention is an all-terrain trailer that has a condensed, self-contained stowed state, making it easy to transport across rugged terrain. The trailer is a rectangular basket that defines a storage volume. Two wheels and an axle are removably securable to the basket body, converting it into a trailer. When the wheels are not needed, they are removed, and stored within the storage area of the basket. The axle too, has a designated storage area within the basket.

In an alternative embodiment of the basket trailer, an additional storage area is included. This storage area extends down below the bottom of the basket into an open area defined by a lower lip of the basket. The tires and axle can be placed within the extended storage area when not in use. A false bottom lies on top of the storage cavity creating an even flat surface on the bottom of the basket body.

The trailer has varied methods of use, which are suited to a user's different hauling needs. The basket body can be secured to the hood of a lead vehicle to facilitate carrying of small items in the basket. Carrying of larger items requires affixing the axle and wheels to the basket body and hooking the trailer to the lead vehicle. In this way, the present invention is both a storage basket for an all-terrain vehicle, or a trailer, and is useful as a storage container in both the deployed and stowed state.

It is therefore an object of the present invention to provide a new and improved all-terrain trailer device that has all of the advantages of the prior art and none of the disadvantages.

It is therefore an object of the present invention to provide an all-terrain trailer that has removable wheels for easy storage.

Another object of the present invention is to provide an all-terrain trailer that can be used for storage, even in a stowed position.

Yet another object of the present invention is to provide an all-terrain vehicle with a false bottom that covers a tire storage compartment, thereby facilitating carrying of small objects, even when the trailer is stowed.

Still another object of the present invention is to provide a versatile and collapsible all-terrain vehicle that is easily transported and deployed within the use of special tools.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
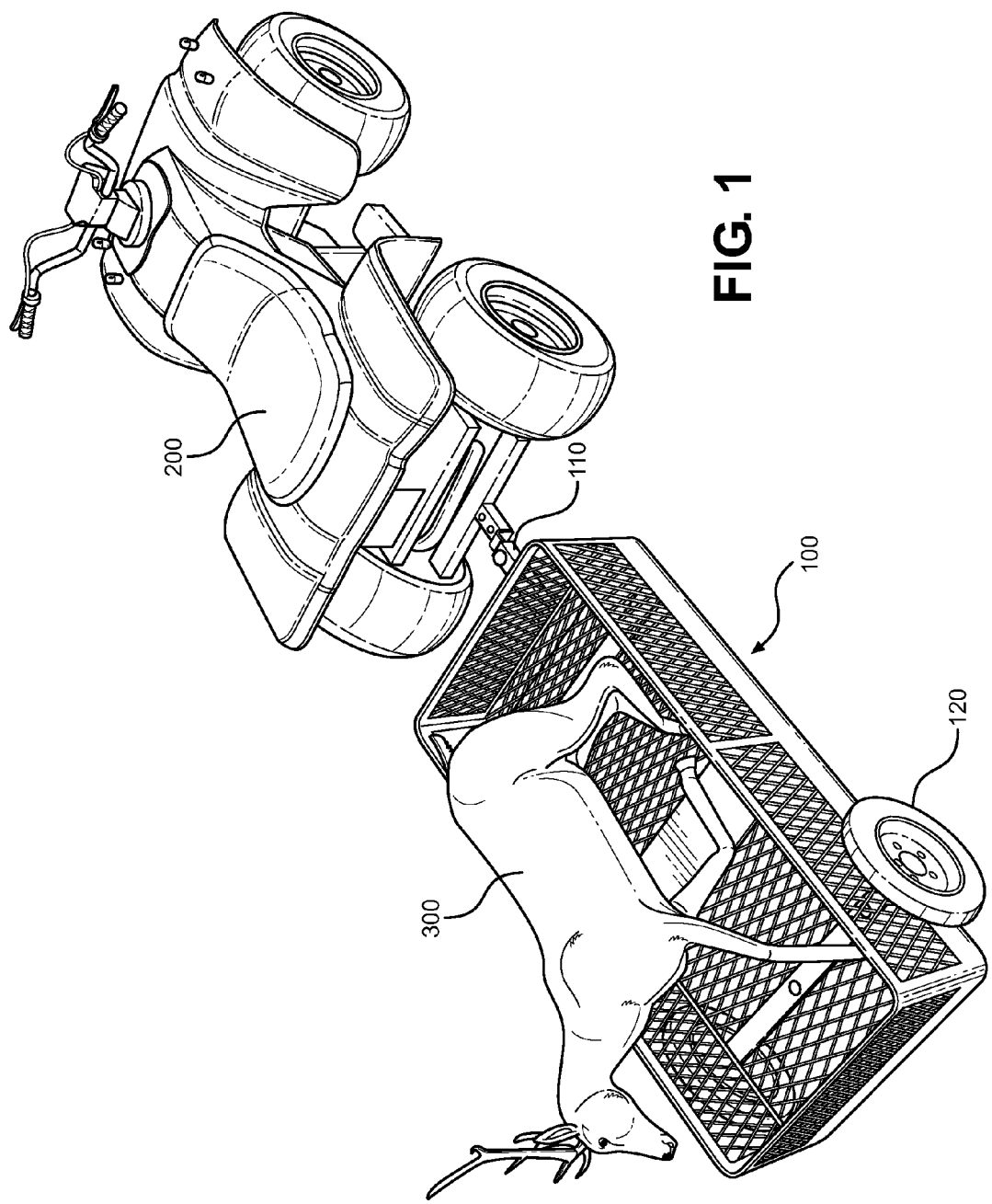
FIG. 1 shows a perspective view of the all-terrain trailer in a deployed state, and in use for hauling a felled deer.

Reference is made herein to the attached drawings. Like reference numerals are used throughout the drawings to depict like or similar elements of the all-terrain trailer. For the purposes of presenting a brief and clear description of the present invention, the preferred embodiment will be discussed as used for hauling objects over uneven terrain. The figures are intended for representative purposes only and should not be considered to be limiting in any respect.

Referring now to FIG. 1, there is shown an all-terrain vehicle (ATV) pulling a trailer. The ATV 200 is affixed to the trailer 100 via trailer hitch linkage 110 extending from the front of the trailer. This trailer hitch linkage is a removable bar assembly that is connected to the trailer my fasteners such as bolts or pins. A pair of wheels 120 at the back end of the trailer allows the trailer to roll over uneven terrain. For this reason, the wheels are made of a durable shock absorbent material, and have a large tire tread surface area. Inside the trailer the body of a deer 300 is placed for transport. Large items such as felled game, tools, chopped wood and the like, can be safely and easily stored in the trailer during hauling over rough terrain.

Figure 2:
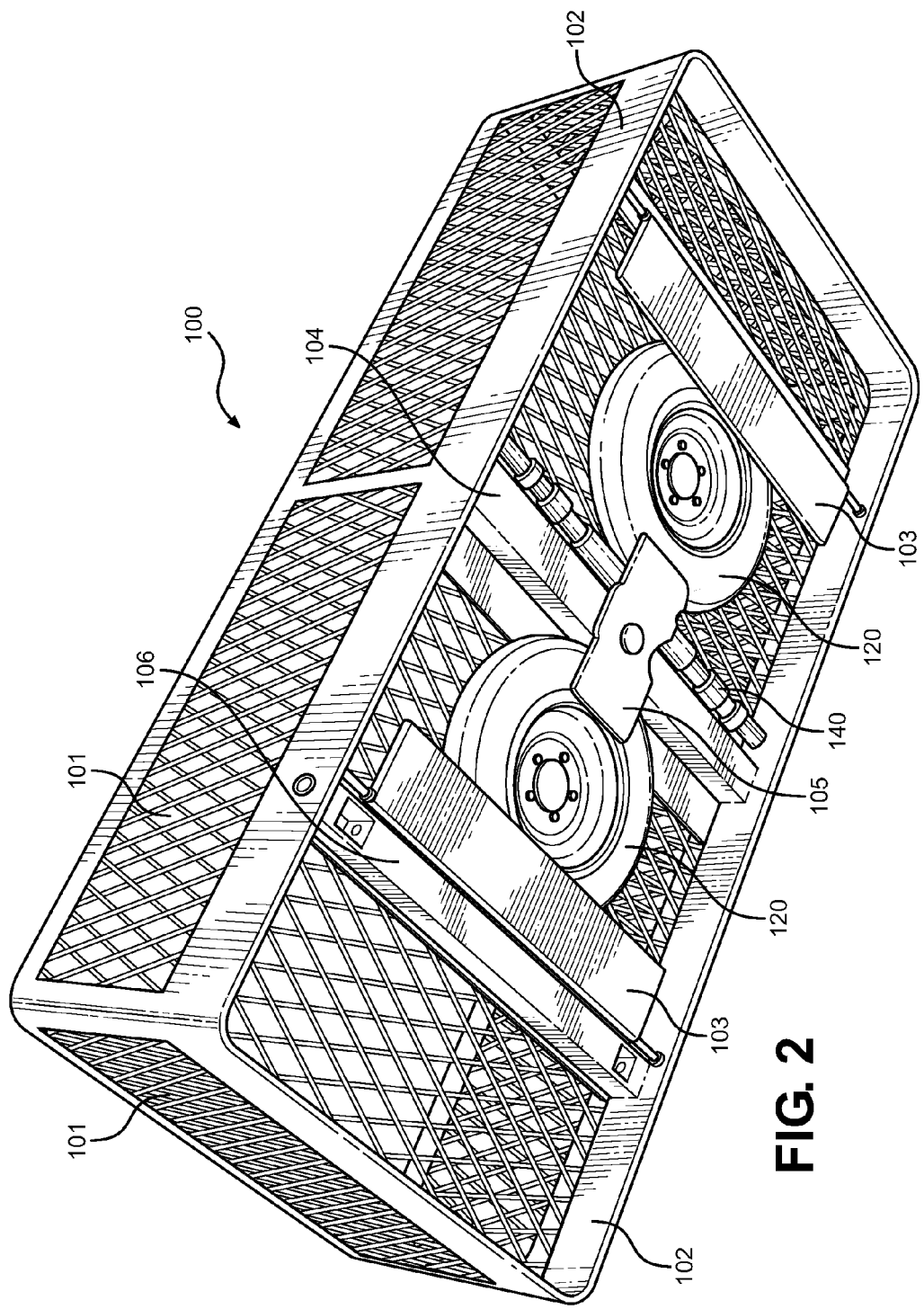
FIG. 2 shows a perspective view of the underside of the trailer basket body, with the tires and axle in a stowed position.

Referring now to FIG. 2, there is shown an underside view of the trailer in a stowed state. The trailer 100 has a basket body made of a durable skeleton frame and grate sidewalls 101 extending between the skeleton frame and defining an open upper volume. In a preferred embodiment this frame comprises a solid upper ring, four corner supports and a lower ring 102. Intermediate supports may be disposed between corner supports along the sidewalls to improve structural integrity. The bottom of the basket body is formed of metal grate and may have lateral solid supports running through it to reduce deformation of the bottom during load bearing. Below the ring is an open lower volume defined by the lower ring, which extends down past the basket bottom for several inches. A central support beam 104 bisects the volume and extends from one interior surface of the lower ring to another. This support beam is thick and rigid, supporting the basket bottom from underneath. A short cross bar 105 is fastened to the support beam, forming a tired support tabs. Combined with two tire support shelves 103 that extend laterally across the open volume, the tire support tabs form a storage area for the tires 120 and axle 140. Removal of the components from the storage area is achieved by loosening the fastener on the crossbar and turning the bar sideways, then sliding the free portion of a tire downward and away from the tire support shelf. The axle can then be inserted into a hole providing access to the axle support beam 106, which is similar in construction to the center support beam, but is disposed along the rear end of the trailer basket, and has a hollow tunnel sized to house the axle. Tires are connected to the ends of the axle to complete the conversion from stowed to deployed state.

Figure 3:
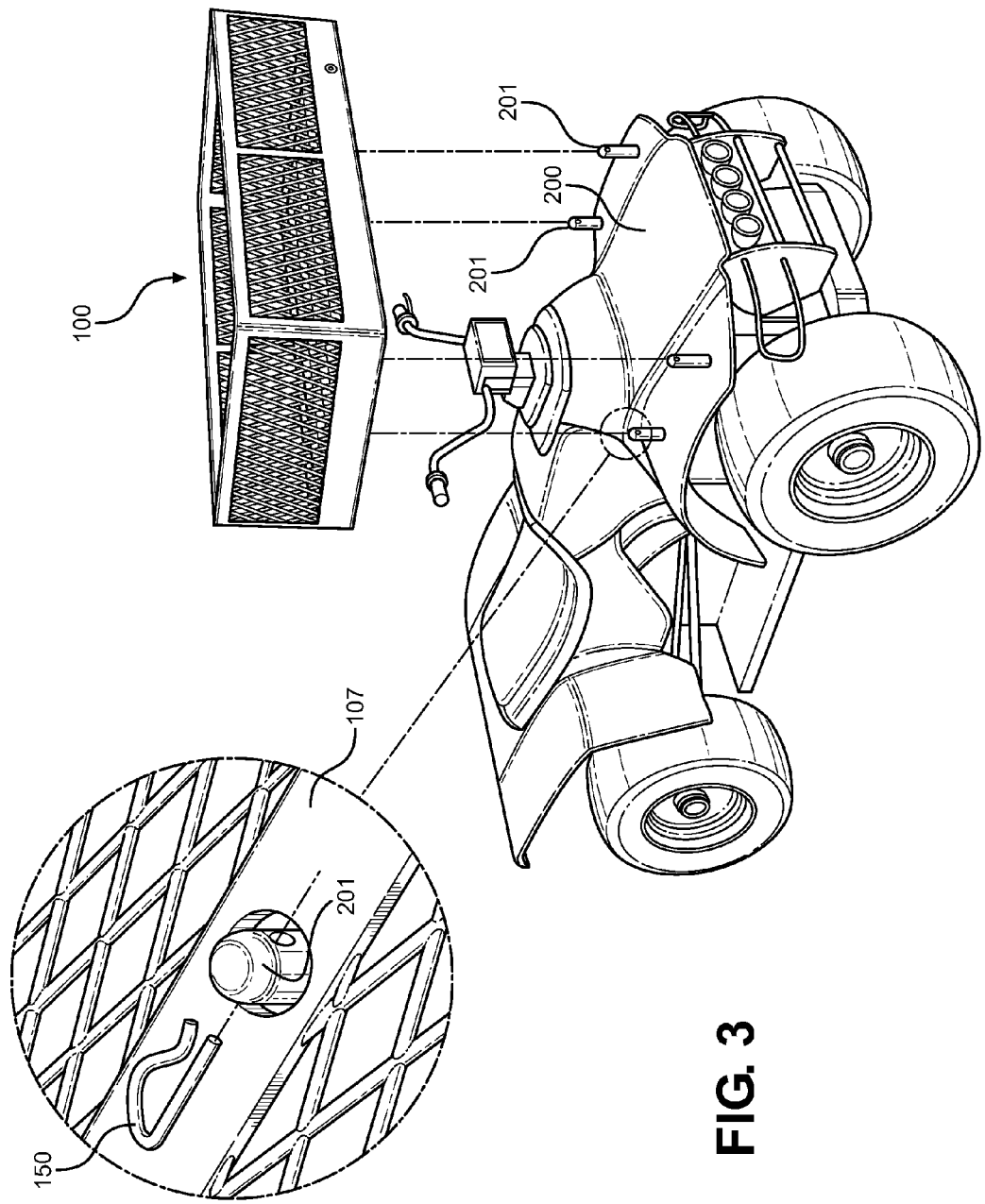
FIG. 3 shows a perspective view of the trailer in a stowed position attaching to the hood of an ATV.

When the trailer is not needed for hauling, it can be secured to the lead vehicle and used as a carrying basket. In FIG. 3, the trailer 100 is shown, in the process of attachment to an ATV 200 hood. A plurality of holes is drilled in the ATV hood, through which several securing posts 201 protrude. The securing posts may be permanently affixed to the underside of the hood or may be removably inserted through the hood apertures. Positioning of the hood apertures and securing posts aligns with apertures in the lateral support bars 107 of the trailer basket. When the basket is lowered onto the ATV hood, the securing posts pass through the apertures in the lateral support bars and protrude slightly into the basket upper volume. Each securing post has a tunnel extending through the post's upper portion. Pins 150 are slid through the hole in each post, securing the basket in place. A variety of pins or fastener types may be used, so long as they are easy to insert and remove without specialized tools. Items may then be placed in the trailer basket's volume for storage while the ATV is in transit.

For those who are unwilling to drill holes in their ATV or trailer hood, a metal plate can be included to facilitate securing of the trailer body to an ATV rack. The plate has holes for the securing posts, and connects with the lateral supports of the basket body in the manner described above. Additional fastening means for securing the plate to a trailer or ATV rack are included. In this way, the trailer body can be removably secured to the front or rear ATV rack, and can be easily transferred from one vehicle to another.

Figure 4:
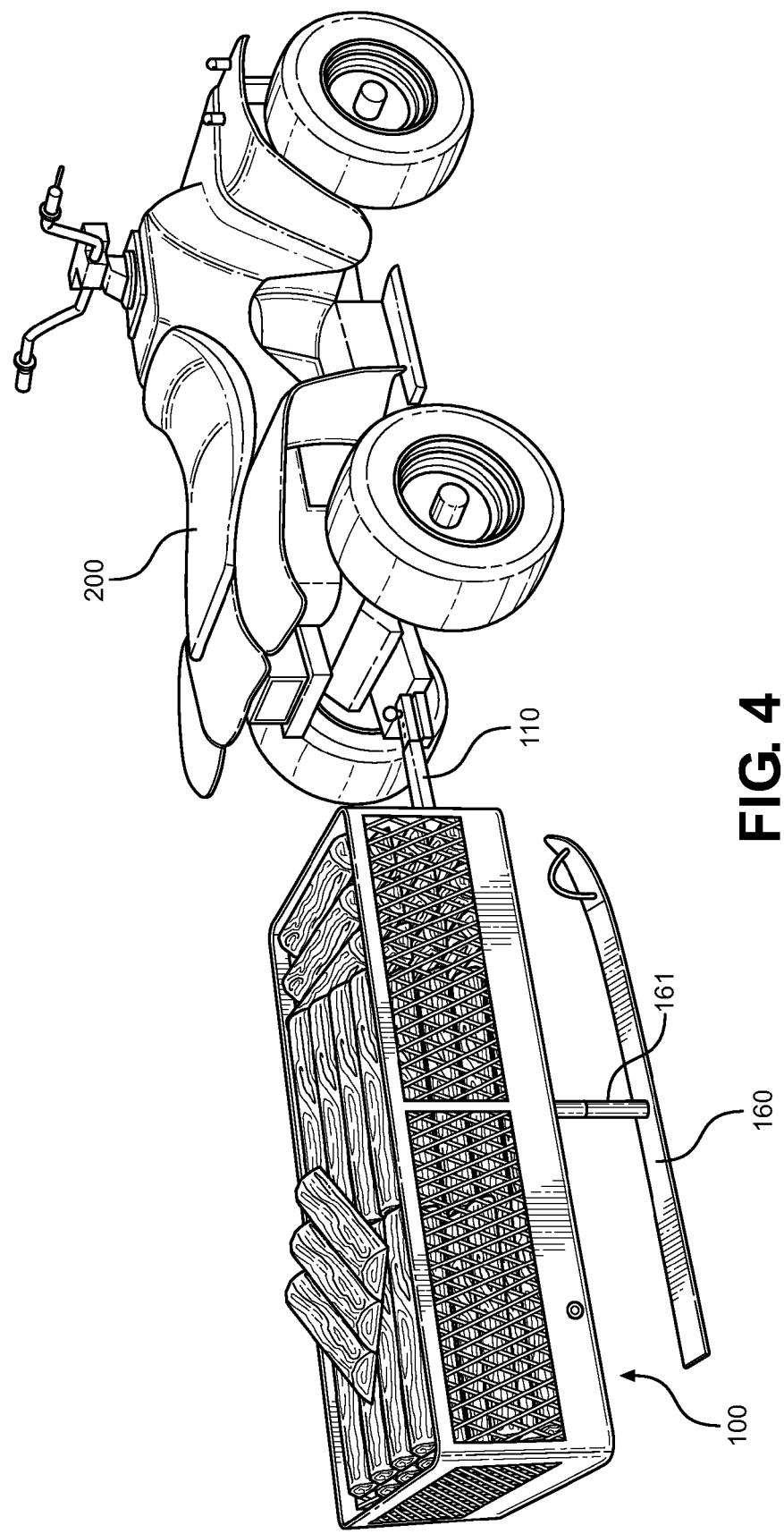
FIG. 4 shows a perspective view of an alternative embodiment of the present invention using modified ski attachments to help the trailer travel over snow covered terrain.

Turning now to FIG. 4, there is shown an alternative embodiment of the all-terrain trailer. The trailer 100 is secured to an ATV 200 via the trailer hitch linkage 110 and is used to haul chopped wood. In this embodiment, a pair of skis 160 is secured to the trailer via ski supports 161. The ski supports are removably secured to the center support beam and may be secured with threading or by other fasteners. Optionally, the ski supports are telescoping, to permit adjustment of their height. Both the skis and ski supports may be removed and stowed in much the same way as the tires and axle discussed in the primary embodiment. This embodiment is ideal for use in climates that experience harsh winters or heavy snowfall. Standard trailer tires are not well suited to snow-covered terrain because they cannot make sufficient surface area contact to roll properly over underlying terrain.

Figure 5:
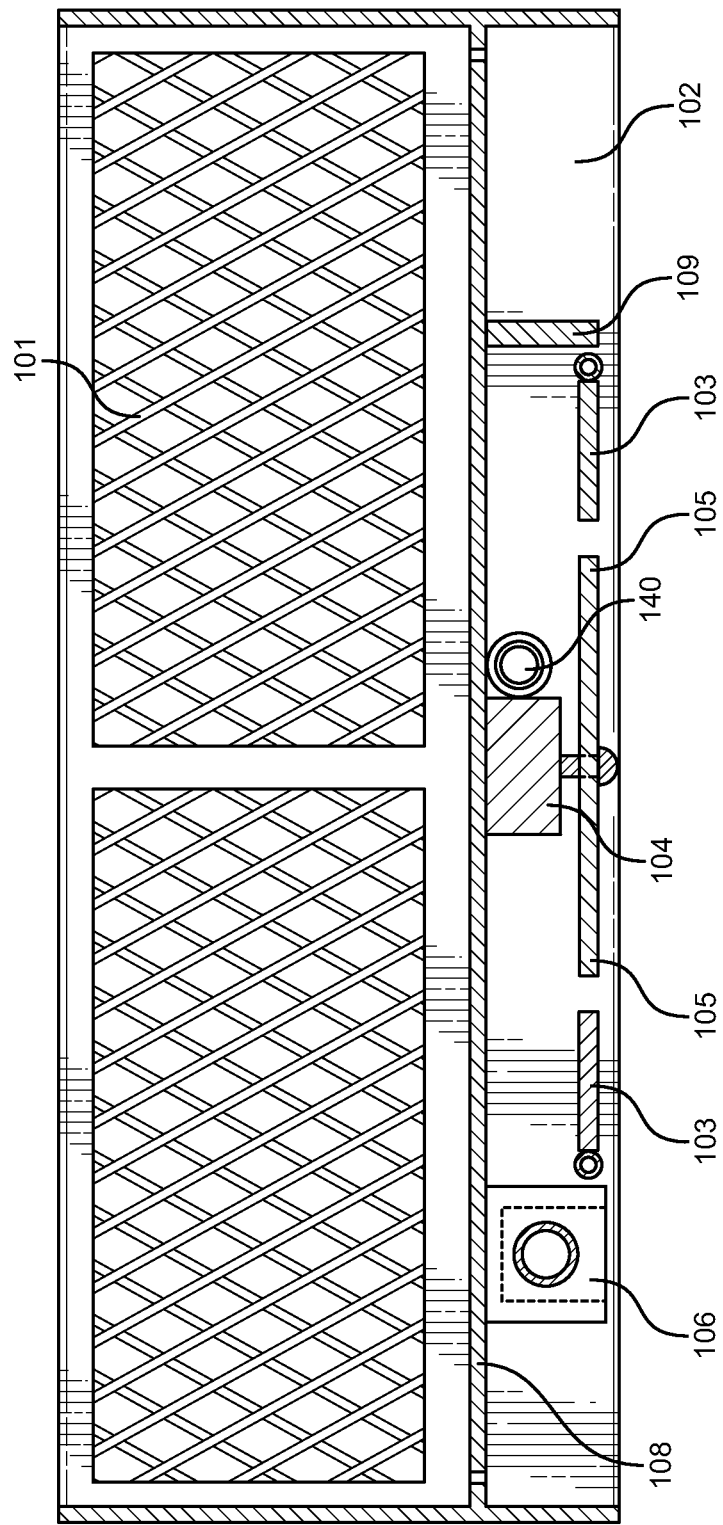
FIG. 5 shows a cross-section view of an embodiment of the all-terrain vehicle basket body.

Referring to FIG. 5, there is a cross-section view of the primary embodiment of the all-terrain trailer basket. The trailer basket has a skeletal frame with grating sidewalls 101. A solid upper ring, corner and intermediate supports, and lower ring 102 is visible. The trailer has a false bottom 108 that can be lifted out through the open upper volume to expose the component storage area. The false bottom is a useful feature because it provides a level surface for items placed in the open upper volume to rest upon. It is supported by the central support beam 104, a front support beam 109 and the axle support beam 106. The bottom also provides the user with ready access to the tires and axle, without having to unsecure the crossbar 105. Tires and axle 140 can be easily lifted out through the open upper volume, once the false bottom is removed. Likewise, they can be inserted into the storage area after hauling is complete. Two tire support shelves 106 provide a primary support for the stowed tires (not shown), while an opposing end of each supported by the crossbar. Similarly, the axle 140 may be stored by pressing it down onto the crossbar, next to the central support beam and wedging a tire in next to the axle.

Figure 6:
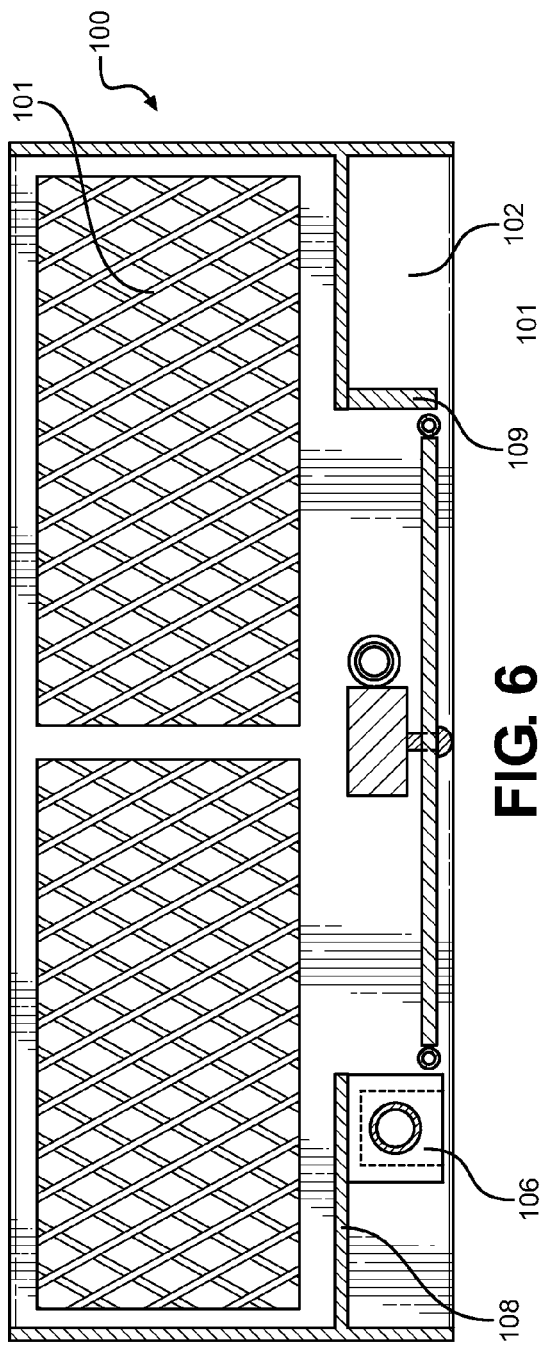
FIG. 6 shows a cross-section view of an alternative embodiment of the device, having no false bottom.

An alternative embodiment of the trailer basket is shown in FIG. 6 in cross-section. This embodiment has no false bottom, having instead two shelves at the basket bottom 108 that dip downward into the storage area. A solid storage area bottom replaces the tire support shelves and crossbar. As with the primary embodiment, the storage area is bounded in front by a front support beam 109, in back by the axle support beam 106, and on the sides by the solid lower ring b102. The lack of removable bottom makes insertion and removal of the tires or skis easier for the user. Items can still be stored within the upper volume of the basket, but may not be able to lie flat.

Figure 7:
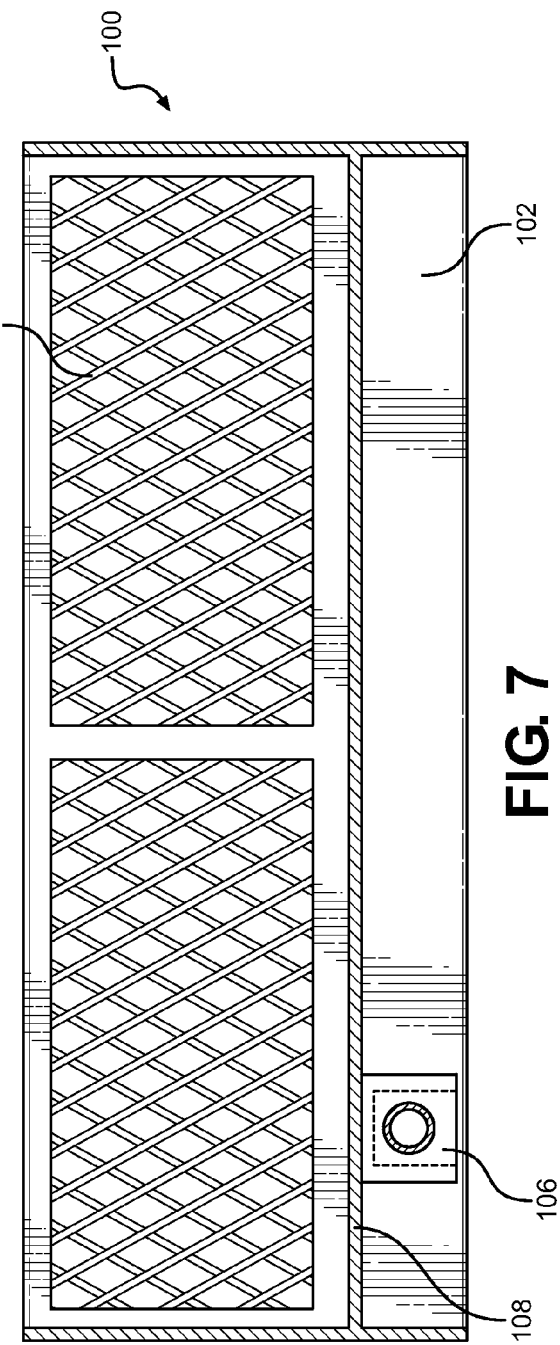
FIG. 7 shows a cross-section view of an alternative embodiment of the device, having no storage compartment.

Turning to FIG. 7, another alternative embodiment of the device is shown in cross-section. The trailer 100 has a basket body with a flat bottom 108 that may be made of grating material like that of the sidewalls 101 or may be the same solid material as the skeletal frame. Items of various size and shape may be stored within the upper volume of the basket. Unlike other embodiments, there is no storage area structure within the open lower volume, only the axle support beam 106. The axle and tires are stored, like other items in the basket upper volume when the trailer is not in use for hauling. Small brackets or tie downs can be affixed to the grating of the sidewalls to help secure these components during transit.

Figure 8:
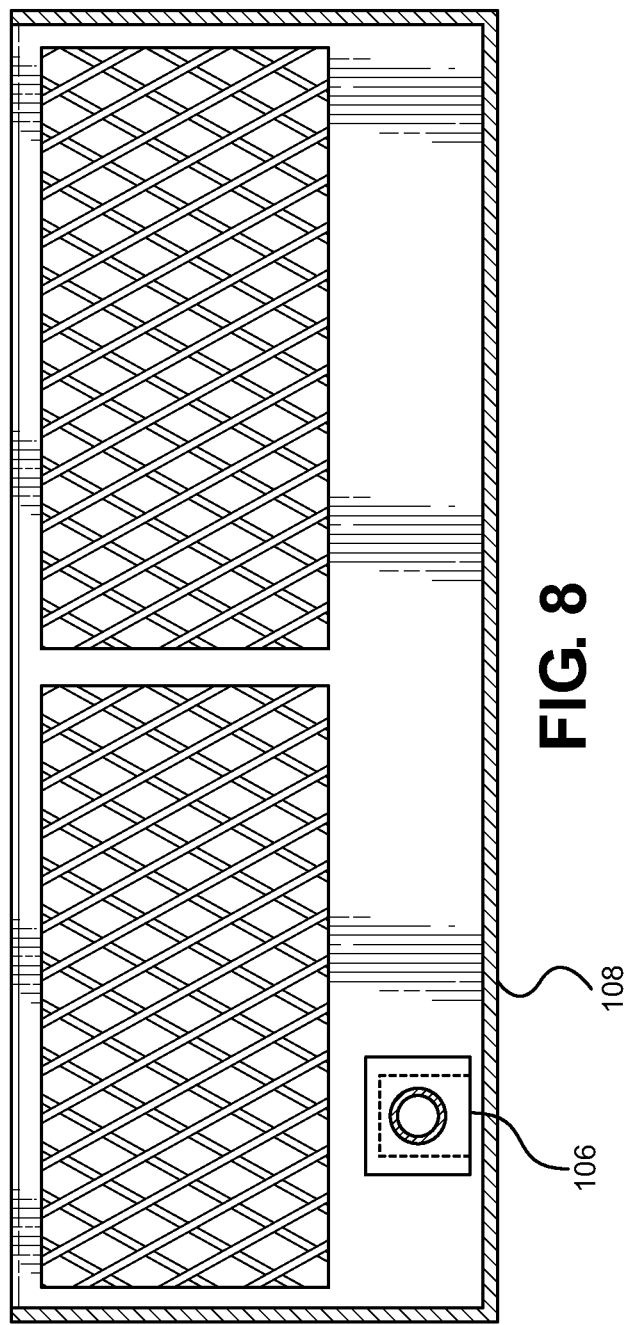
FIG. 8 shows a cross-section view of an embodiment of the basket with no overhanging lip.

Another embodiment of the trailer is shown in FIG. 8 in cross-section. The trailer body 100 has no lower lip, and the bottom 108 extends from the lower perimeter of the skeletal frame. An axle support beam 106 extends across or through the bottom of the basket. Alternatively, there may be an opening in the grated sidewalls 101 to permit the axle support beam to pass therethrough. It is preferred that the support beam passes over or through the bottom and does not rely on the sidewalls to assist in load bearing as this could cause deformation of the grating over extended use.

Figure 9:
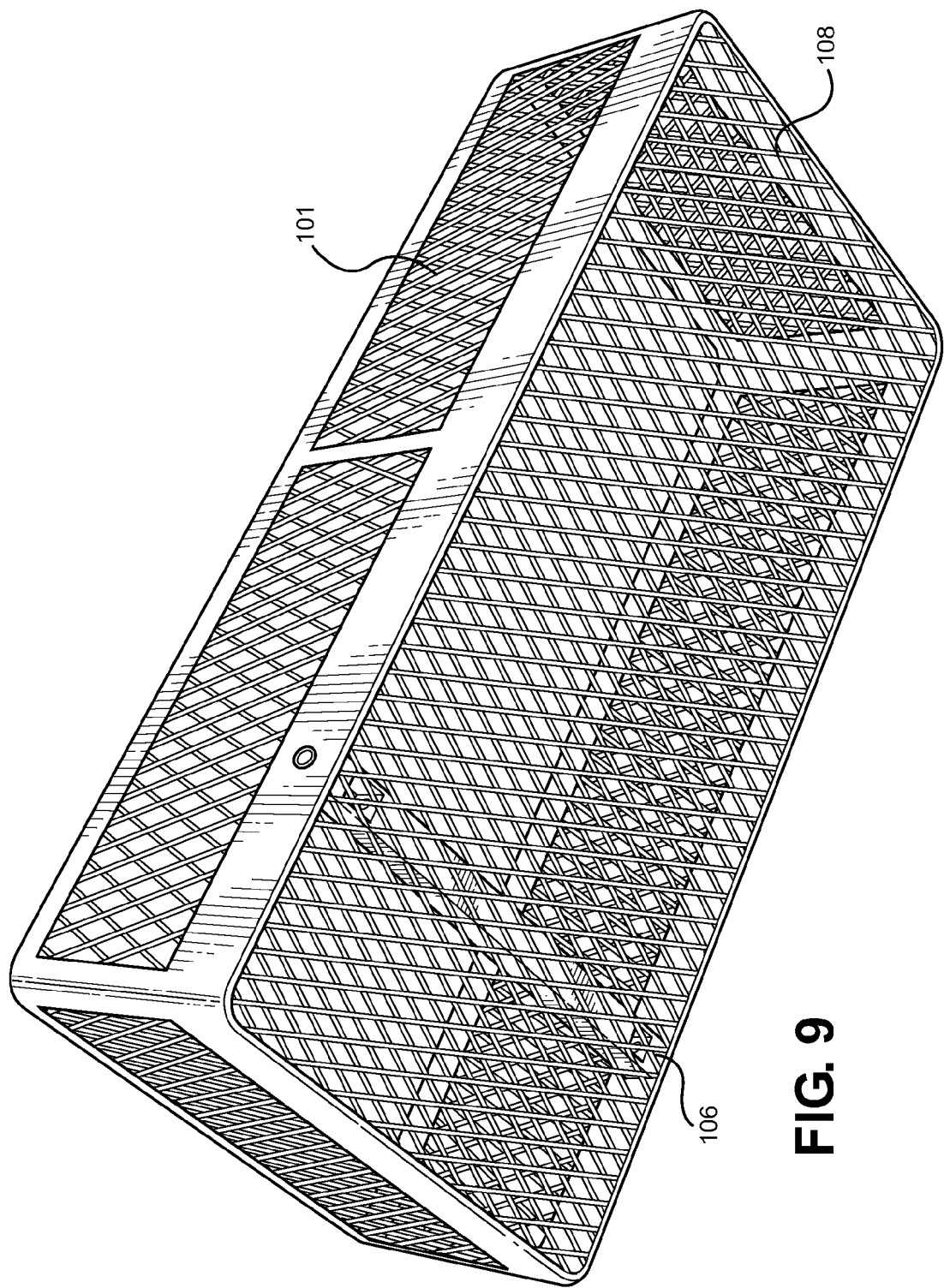
FIG. 9 shows a perspective view of the underside of the basket body with no overhanging lip or storage area.

The underside of the flat bottom basket embodiment is shown in FIG. 9. Though the skeletal frame and grated sidewalls 101 of the trailer body 100 are similar to other embodiments, this embodiment has a bottom 108 that extends across the entire lower edge cross-section. A single interior volume is created for storage of miscellaneous items, including the tires, and axle. The axle support beam is shown, extending across the upper surface of the basket body bottom.

In use an individual mounts the trailer basket to the food of an ATV, snowmobile or tractor. This is accomplished by aligning apertures in the basket bottom with securing posts protruding upwards from the vehicle hood and then lowering the basket down over the posts. Once the securing posts are sticking up through the holes in the basket bottom, pins are inserted through holes in the upper portion of each securing post to lock the basket in position on the vehicle hood. Items such as firearms, food supplies, first aid kits, fire starting supplies, and other camping gear, are placed in the upper volume of the trailer basket for transport. Once the vehicle reaches a target location and larger objects need to be hauled, the user removes the pins and slides the basket off the hood. Any objects placed during transit are removed, and the false bottom of the trailer is taken out. Two tires and an axle are taken out of the storage area and the bottom is replaced. Then, the axle is inserted into a tunnel in the axel support beam, such that end portions of the axle protrude from opposing sides of the lower ring of the trailer basket. Each tire is secured in turn by slipping a central aperture over the axle end portion and fastening a lugnut or similar fastener over the axle end. A trailer hitch linkage is then affixed to the front portion of the trailer via fasteners. This trailer hitch linkage is secured to a trailer hitch on the lead vehicle. The trailer is then ready for use. Large objects may be placed within the trailer, along with any items removed during conversion of the trailer from the stowed to deployed state. Finally, the lead vehicle is started and drives over the landscape, towing the trailer and its contents behind.

The present invention is thus a versatile, convertible trailer that is useful on all-types of terrain. It has a deployed state, in which wheels or skis are attached to a basket body, so that the trailer can move across terrain while pulled by a lead vehicle. It also has a stowed state, in which the trailer converts to a carrying basket that mounts to the hood of the lead vehicle. Items such as the axle, tires, skis, and ski supports are stowed within the basket body in a storage area generally separated from the upper volume of the basket. In this manner, the all-terrain trailer is useful when deployed and when stowed, making it a significant improvement over prior art devices that are not capable of use when stowed.

The trailer is lightweight, making it easy for the user to manipulate when out in the woods. It may be constructed of metal, hard plastic, wood, or a combination thereof. The configuration of the trailer has been described generally and in detail herein, but minor variations in construction and component parts will be obvious to one of ordinary skill in the art.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An all-terrain trailer, comprising:
   a basket body having four sidewalls and a bottom defining an open upper volume, and a lower lip extending down below the perimeter of said bottom, defining an open lower volume;
   a central support beam bisecting said lower volume into a front and rear portion;
   an axle support beam extending across said rear portion of said lower volume;
   a front support beam extending across said front portion;
   a pair of terrain traversing means;
   a terrain traversing means support;
   a trailer hitch linkage having a removable bar assembly that is connected to said basket body by means of a plurality of securing pins;
   a plurality of securing posts having holes extending laterally through their upper ends;
   said plurality of securing posts disposed on an ATV hood to support said basket body above said ATV hood;
   a cross bar secured to said central support beam by a removable fastener;
   a first tire support shelf extending across said front portion of said lower volume;
   a second tire support shelf extending across said rear portion of said lower volume.

2. The device of claim 1, wherein said bottom is removable and fills a cross-section of said upper volume.

3. The device of claim 1, wherein said bottom is a first shelf disposed along said front portion and a second shelf disposed along said rear portion.

4. The device of claim 1, wherein said terrain traversing means is a tire and said terrain traversing support is an axle.

5. The device of claim 1, wherein said terrain traversing means is skis and said terrain traversing means support is a pair of ski support posts.

6. The device of claim 5, wherein said ski support posts are telescoping.

7. An all-terrain trailer, comprising:
   a basket body having four sidewalls and a bottom defining an open upper volume, and a lower lip extending down below the perimeter of said bottom, defining an open lower volume;
   an axle support beam extending across a rear portion of said lower volume;
   a pair of terrain traversing means;
   a terrain traversing means support;
   a trailer hitch linkage having a removable bar assembly that is connected to said basket body by means of a plurality of securing pins;
   a plurality of securing posts having holes extending laterally through their upper ends;
   said plurality of securing posts disposed on an ATV hood to support said basket body above said ATV hood.

8. The device of claim 7, wherein said terrain traversing means is a tire and said terrain traversing support is an axle.

9. The device of claim 7 wherein said terrain traversing means is skis and said terrain traversing means support is a pair of ski support posts.

10. The device of claim 7, wherein said ski support posts are telescoping.

11. An all-terrain trailer, comprising:
    a basket body having four sidewalls and a bottom defining an open volume;
    an axle support beam extending across a rear portion of said basket body;
    a pair of terrain traversing means;
    a terrain traversing means support;
    a trailer hitch linkage having a removable bar assembly that is connected to said basket body by means of a plurality of securing pins;
    a plurality of securing posts having holes extending laterally through their upper ends;
    said plurality of securing posts disposed on an ATV hood to support said basket body above said ATV hood.

12. The device of claim 11, wherein said terrain traversing means is a tire and said terrain traversing support is an axle.

13. The device of claim 11 wherein said terrain traversing means is skis and said terrain traversing means support is a pair of ski support posts.

14. The device of claim 11, wherein said ski support posts are telescoping.

* * * * *